US008275083B2

(12) United States Patent
Ritter

(10) Patent No.: US 8,275,083 B2
(45) Date of Patent: Sep. 25, 2012

(54) INTEGRATED CIRCUIT FOR AN ASYNCHRONOUS SERIAL DATA TRANSFER WITH A BIT LENGTH COUNTER

(75) Inventor: Joachim Ritter, Lörrach (DE)

(73) Assignee: Micronas GmbH, Freiburg (DE)

( * ) Notice: Subject to any disclaimer, the term of this patent is extended or adjusted under 35 U.S.C. 154(b) by 911 days.

(21) Appl. No.: 11/626,213

(22) Filed: Jan. 23, 2007

(65) Prior Publication Data
US 2007/0189335 A1 Aug. 16, 2007

(30) Foreign Application Priority Data
Jan. 23, 2006 (DE) .................. 10 2006 003 281

(51) Int. Cl.
*H04L 25/40* (2006.01)
(52) U.S. Cl. ............................................. 375/355
(58) Field of Classification Search .................. 375/354, 375/355, 376; 327/144, 145, 151, 152, 160; 370/516–519; 713/400, 401, 500–503
See application file for complete search history.

(56) References Cited

U.S. PATENT DOCUMENTS

| 4,584,698 | A | * | 4/1986 | Sibigtroth et al. ............ 377/110 |
| 5,034,967 | A | * | 7/1991 | Cox et al. ...................... 375/373 |
| 5,371,772 | A | | 12/1994 | Al-Khairi |
| 5,787,132 | A | | 7/1998 | Kishigami et al. |
| 5,903,521 | A | * | 5/1999 | Relph ............................ 368/113 |
| 6,470,393 | B1 | | 10/2002 | Heinrich et al. |
| 2005/0177758 | A1 | * | 8/2005 | Stickle .......................... 713/400 |

FOREIGN PATENT DOCUMENTS

| DE | 195 34 693 | 3/1997 | |
| EP | 0 370 528 | 5/1990 | ............ 7/33 |

OTHER PUBLICATIONS

PrimeCell UART (PL011) Technical Reference Manual, No. r1p4, 2005, XP-007901821, http://www.arm.com/pdfs/DDI0183F_uart_p1011_r1p4_trm.pdf.
ANON: "PC16550D Universal Asynchronous Receiver/Transmitter with FIFOs," Announcement National Semiconductor, Jun. 1995, pp. 1-22, XP-002264776.

* cited by examiner

*Primary Examiner* — Young T. Tse
(74) *Attorney, Agent, or Firm* — Muncy, Geissler, Olds & Lowe, PLLC

(57) ABSTRACT

An integrated circuit for an asynchronous serial data transfer comprises a sampler to sample the asynchronous serial data using a sampling clock. A bit length counter determines a bit time by counting a number (m) of predetermined clock cycles, where the bit length terminal variably adjusts the number (m) of clock cycles of the bit length counter.

6 Claims, 3 Drawing Sheets

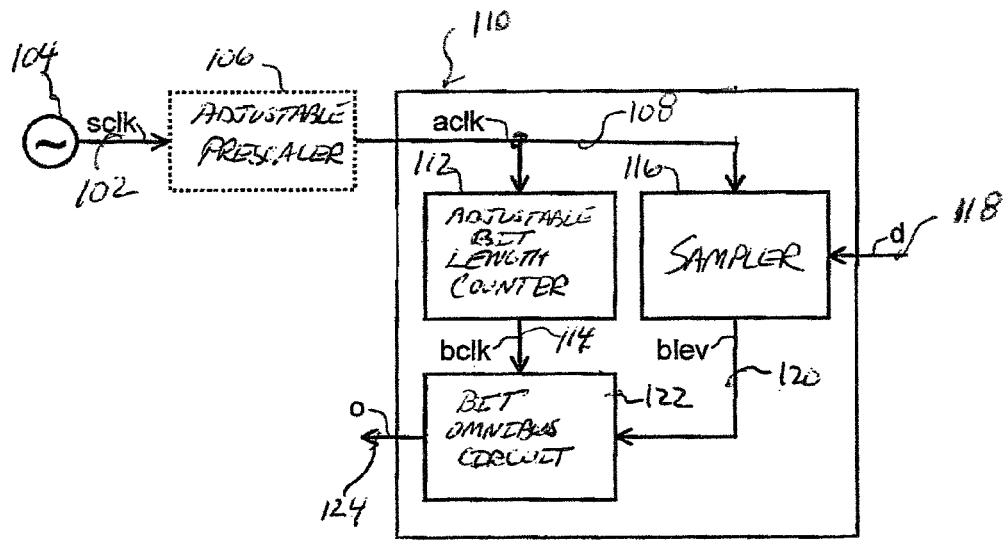
Fig. 1
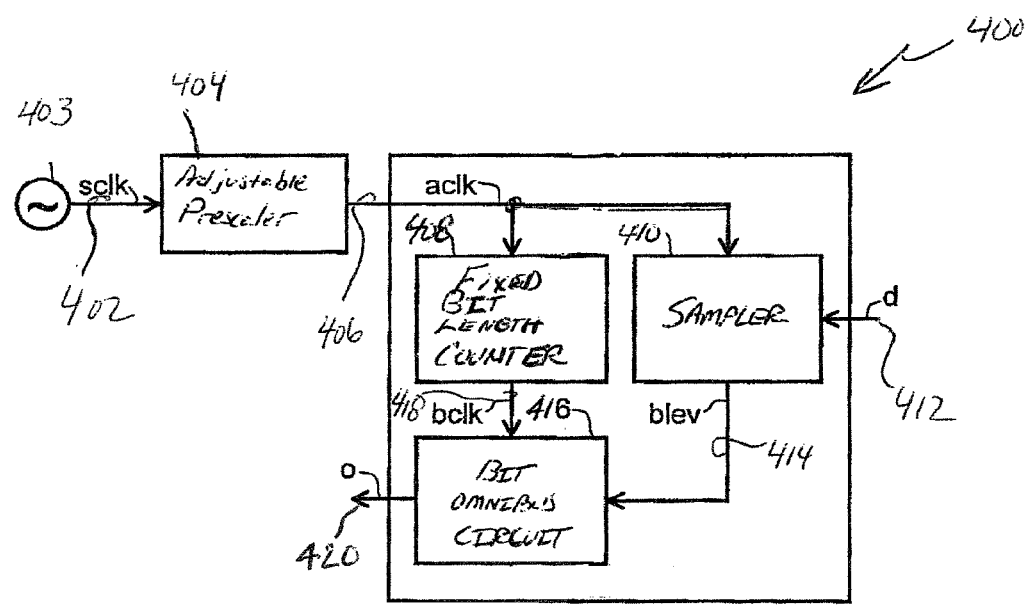
Fig. 4 - PRIOR ART

INTEGRATED CIRCUIT FOR AN ASYNCHRONOUS SERIAL DATA TRANSFER WITH A BIT LENGTH COUNTER

PRIORITY INFORMATION

This patent application claims priority from German patent application 10 2006 003 281.0 filed Jan. 23, 2006, which is hereby incorporated by reference.

BACKGROUND INFORMATION

The invention relates to an integrated circuit for asynchronous serial data transfer, and in particular to an integrated circuit for an asynchronous serial data transfer with a bit length counter.

In a communications system composed of one or more transmitters and receivers, data are transmitted such the transfer speed or transfer rate is defined by the number of transferred bits per second, or by the reciprocal thereof, the duration of a bit.

A transfer is termed "serial" when the individual bits are transferred between a transmitter and a receiver in succession. A transfer is termed "asynchronous" when no clock signal is transmitted with the data between the transmitter and the receiver, which would enable a synchronous sampling of the individual bits in the receiver. With an asynchronous transfer, a receiver must accordingly detect a synchronization character sent at the beginning of a transmission, and starting therefrom must calculate the sampling instants for the subsequent data bits. To this end, the receiver must be able to precisely adjust the time period for the transfer of one bit, that is, the bit length. Generally, a receiver can only set bit lengths that match an integer number of clock cycles of a separate clock generator or oscillator. For this reason, the receiver can only set a desired transfer rate with a limited precision. This theoretically attainable precision depends, among other factors, on the ratio of the transfer rate to the frequency of the oscillator. The theoretically attainable precision G1 is calculated by:

$$G1 = U/F \times 100$$

where G1 is the fundamentally or theoretically attainable precision as a percentage, U is the transfer rate in bits/s, and F is the frequency of the oscillator in Hz.

FIG. 4 illustrates a receiver 400 for serial data streams of an asynchronous transfer. A system clock sclk on a line 402 is applied by an oscillator 403 to an adjustable prescaler 404 to divide the system clock sclk on the line 402 by the divisor n. The adjustable prescaler 404 outputs a corresponding sampling clock aclk on a line 406. The sampling clock on the line 406 is applied to a fixed bit length counter 408 and a sampler 410. In addition, a sequence of serial data d on a line 412 is applied to the sampler 410 which are sampled by the sampling clock aclk on the line 406. The sampler 410 outputs a corresponding bit level blev on a line 414 to a bit omnibus circuit 416. The fixed bit length counter 408 divides the applied sampling clock aclk on the line 406 by, for example, the fixed set value 16 and outputs a corresponding bit clock bclk on a line 418 to the bit omnibus circuit 416. The bit omnibus circuit 416 generates a corresponding output signal or output data o on a line 420 which are applied to an output of the receiver.

This type of receiver for asynchronous serial data subdivides the bit time into a fixed number of sampling clock cycles, for example, 8 or 16 clock cycles per bit. The sampling clock aclk on the 406 is derived by the adjustable prescaler 404 from the system clock sclk. What is adjustable here is the division to be performed by the prescaler 404 to supply the desired sampling clock aclk. However, the number of clock cycles per bit is defined by the hardware, that is, by the structural design of the fixed bit length counter 408 of a corresponding integrated circuit. The prescaler 404 can generally be loaded only with integer divisors n. These requirements—a fixed number of clock cycles per bit and integer divisors n for the prescaler 404—limit the attainable precision. The precision here depends on the ratio of the transfer rate to the frequency of the oscillator 403 divided by the number of clock cycles per bit. The attainable precision corresponds to:

$$G2 = (U \times TpB)/F \times 100$$

where G2 is the attainable precision as a percentage, U is the transfer rate in bits/s, TpB is the number of clock cycles per bit, for example, 8 or 16, and F is the frequency of the oscillator in Hz.

Correspondingly, the bit length immediately changes by 8 or 16 oscillator cycles when the divisor of the prescaler 404 is changed by 1. A convergence on a desired bit length can only be implemented in increments of 8 or 16 oscillator cycles, thereby resulting in the worst case in an erroneous determination of 4 or 8 oscillator cycles.

A receiver for asynchronous serial data transfers to which a baud rate generator for supplying two different clocks is connected on the input side is known from ARM PrimeCell UART(PL011), Technical Reference Manual, 2001. A receiver in which one of two different clocks is selectable is known from DesignWare DW_apb_uart Databook, chapter 1: Description of DW_apb_uart, 2003. This presupposes explicit limits for reception. A programmable baud rate generator is known from National Semiconductor, PC16550D Universal Asynchronous Receiver/Transmitter with FIFOs, June 1995. A programmable baud rate generator which generates a baud rate clock and a receiver reference clock is known from QuickLogic Corporation, Open Source 16550 UART Core, Application Note 69, 2002.

What is disadvantageous in all receivers is the large increment width of 8 or 16 oscillator cycles. The result of this is that at a specific oscillator frequency certain transfer rates cannot be set with the required precision. For example, a transfer rate of U=20 kbits/s, and oscillator frequency of F=4 MHz, and a bit length of TpB=8 cycles results in an attainable precision of G2=20000/4000000×8×100=4%. This kind of error, however, is not tolerable in many applications.

To reduce this large increment width of normally 8 or 16 cycles, and thus the maximum residual error, a technique is employed which is called a "fractional prescaler," by which is meant a prescaler which at specific intervals lengthens or shortens a sampling clock by one oscillator cycle. As a result, one or more of the 8 or 16 sampling clocks per bit is lengthened or shortened by one oscillator cycle. Aside from the considerable complexity in terms of methodological technique, there is also the additional factor that implementation of the hardware structures is costly.

A known alternative approach is to influence the oscillator such that its output frequency no longer remains constant, but becomes sometimes faster, sometimes slower, depending on the requirement of the receiver. Such a solution is precluded, however, in systems in which other modules are dependent on a constant oscillator clock, or when two of the described receivers must operate at different transfer rates and are supplied by one common oscillator clock.

There is a need for an improved asynchronous serial data transfer.

SUMMARY OF THE INVENTION

Asynchronous serial data is sampled with a sampling clock, and a bit length counter determines a bit time by counting a number of clock cycles of the sampling clock or of a bit length counter clock, where a variable adjustment of the number of clock cycles of the bit length counter is formed.

The bit length counter may be configured as an adjustable bit length counter.

The sampling clock may be applied to the bit length counter from an adjustable prescaler with an integrated clock selection device.

In one embodiment, the sampling clock and an adjustment parameter for determining the number of clock cycles is applied to a prescaler. The prescaler provides the adjustment parameter and a bit length counter clock for the bit length counter that makes the bit time determinable for the bit length counter by counting the number of clock cycles of the bit counter clock that is variably adjustable relative to the sampling clock. The prescaler may include a clock selection device and an adjustment parameter input to enter the adjustment parameter. The prescaler and the bit length counter may be formed by a common structural unit of the integrated circuit.

An adjustment parameter may be applied to the adjustable bit length counter to variably adjust the bit length counter relative to a sampling clock for sampling asynchronous serial data.

The adjustable prescaler and the fixed bit length counter may be combined to form an adjustable bit length counter. As a result, a desired bit length can be adjusted in oscillator clock increments.

The bit length is advantageously adjustable in smaller increments, and thus more precisely adjustable. An additional property that can be achieved is that the sampler operates at a higher frequency, with the result that a synchronization character at the start of a serial data stream can be sampled at a higher resolution and thus be detected quicker. Another advantage is that delay caused by possible multiple sampling at the data input is no longer of such importance since the delay amounts to a maximum of ⅛ or 1/16, in contrast to the conventional solutions.

The present invention may be implemented in a single integrated circuit, or by a combination of interconnected components. For example, the adjustable prescaler having a clock selection device and a fixed bit length counter as a common component can be provided, while the sampler and the omnibus circuit are provided as one or more additional individual components.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 1 is a block diagram illustration of a receiver for asynchronous serial data;

FIG. 4 illustrates a prior art receiver circuit.

DETAILED DESCRIPTION OF THE INVENTION

Figure 2:
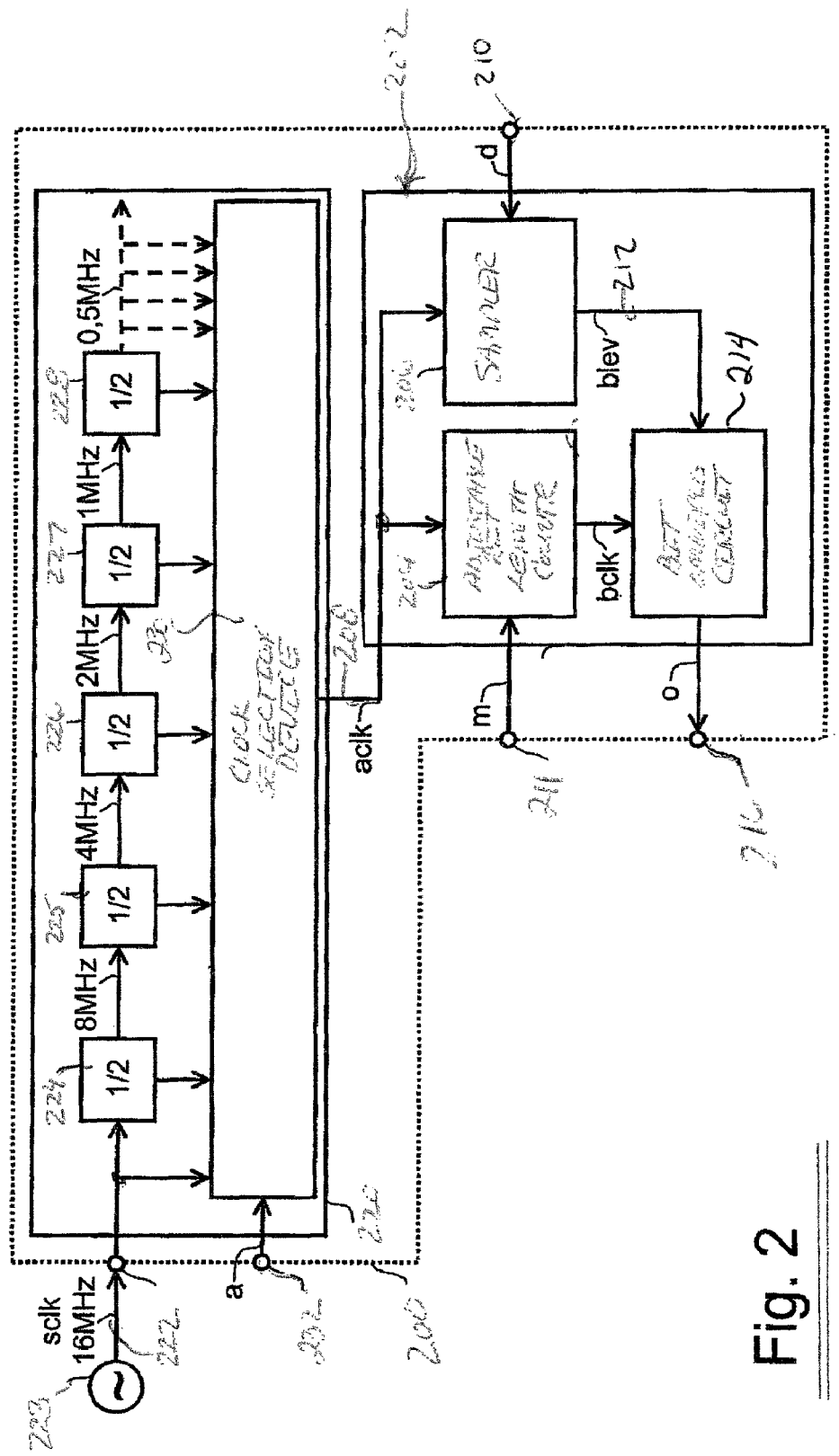
FIG. 2 illustrates another receiver circuit to receive asynchronous serial data.

As is evident in FIG. 1, a preferred receiver circuit according to a fundamental principle shown in simplified form is composed of various individual components that are preferably implemented by an integrated circuit.

A system clock signal sclk on a line 102 is supplied by an oscillator 104 and an adjustable prescaler 106 that divides the system clock signal sclk on the line 102 by an adjustable divisor n. The adjustable prescaler 106 outputs a correspondingly generated sampling clock signal aclk on a line 108 that is applied to a receiver 110. The adjustable prescaler 106 is an optional component based on an especially simplified embodiment, and can also be eliminated.

Aside from additional, possibly conventional, components, the receiver 110 includes an adjustable bit length counter 112 that receives sampling clock signal aclk on the line 108. The adjustable bit length counter 112 divides the sampling signal aclk by an adjustable divisor m, so as to output a bit clock bclk on a line 114. In one embodiment, divisor m corresponds to a number m of clock cycles of the sampling clock aclk that are counted by the bit length counter 112 in order to determine a bit time. The divisor or number m can be adjusted as required such that the bit length counter 112 is adjustable in terms of determining a bit time.

The receiver 110 also includes a sampler 116 that receives the sampling clock signal aclk on the line 108. The sampler 116 also receives asynchronous serial data d on a line 118 that are sampled by the sampling clock aclk. The sampler 116 outputs a bit level signal blev on a line 120.

The receiver 110 farther includes a bit omnibus circuit 122, that receives the bit level blev on the line 120 and the bit clock bclk on the line 114. The bit omnibus circuit 122 generates a corresponding output signal o on a line 124.

The receiver 110 is preferably formed by appropriate structures of an integrated circuit, where the integrated circuit has internal terminals to apply the sampling clock aclk and the asynchronous serial data d on the line 118, and also to output data o on the line 124 correspondingly supplied from the bit omnibus circuit 122. In this embodiment, the adjustable bit length counter 112 accordingly comprises in combined form both an adjustable prescaler as well as a fixed bit length counter. As a result, a desired bit length can be adjusted in oscillator clock increments when the oscillator clock sclk on the line 102 is applied directly as sampling clock aclk, bypassing the additional optional adjustable prescaler 106.

FIG. 2 shows another embodiment of an integrated circuit 200 comprising a receiver 202, similar to the receiver 110 illustration of FIG. 1. The receiver 202 comprises an adjustable bit length counter 204 and sampler 206 to which sampling clock signal aclk on a line 208 is applied. Asynchronous serial data d on a line 210 are applied to the sampler 206. The divisor or number m of clock cycles of the bit length counter 204 are supplied through a bit length terminal 211 for the bit length counter 204. The bit clock of the bit length counter 204 and bit level signal blev on a line 212 are applied to the bit omnibus circuit 214 that supplies data o on a line 216.

Prescaler 220 is connected on the input side of the receiver 202. The prescaler 220 receives an input clock signal on a line 222 from an oscillator 223. The clock signal on the line 222 is applied to a clock divider chain that includes a plurality of clock dividers 224-228 connected in series. For example, the system clock sclk on the line 222 at 16 MHz is scaled by the first clock divider 224 down to 8 MHz, by the second clock divider 225 down to 4 MHz, et cetera. Each clock divider applies a corresponding clock signal to a clock selection device 230, which also receives system clock sclk on the line 222. In addition, a selection signal a on a line 232 is applied to the clock selection device 230. Based on selection signal a on the line 232 which represents an adjustable parameter, the clock selection device 230 selects a corresponding clock signal which is supplied as the sampling clock aclk on the line 208 for the receiver 202. An optional prescaler is thus connected on the input side of the receiver 202, which prescaler enables an expanded clock selection and thus greater bandwidth. It must also be noted here that $½_n$ as the divisor is a special case which is relatively easy to implement in terms of circuit engineering.

Figure 3:
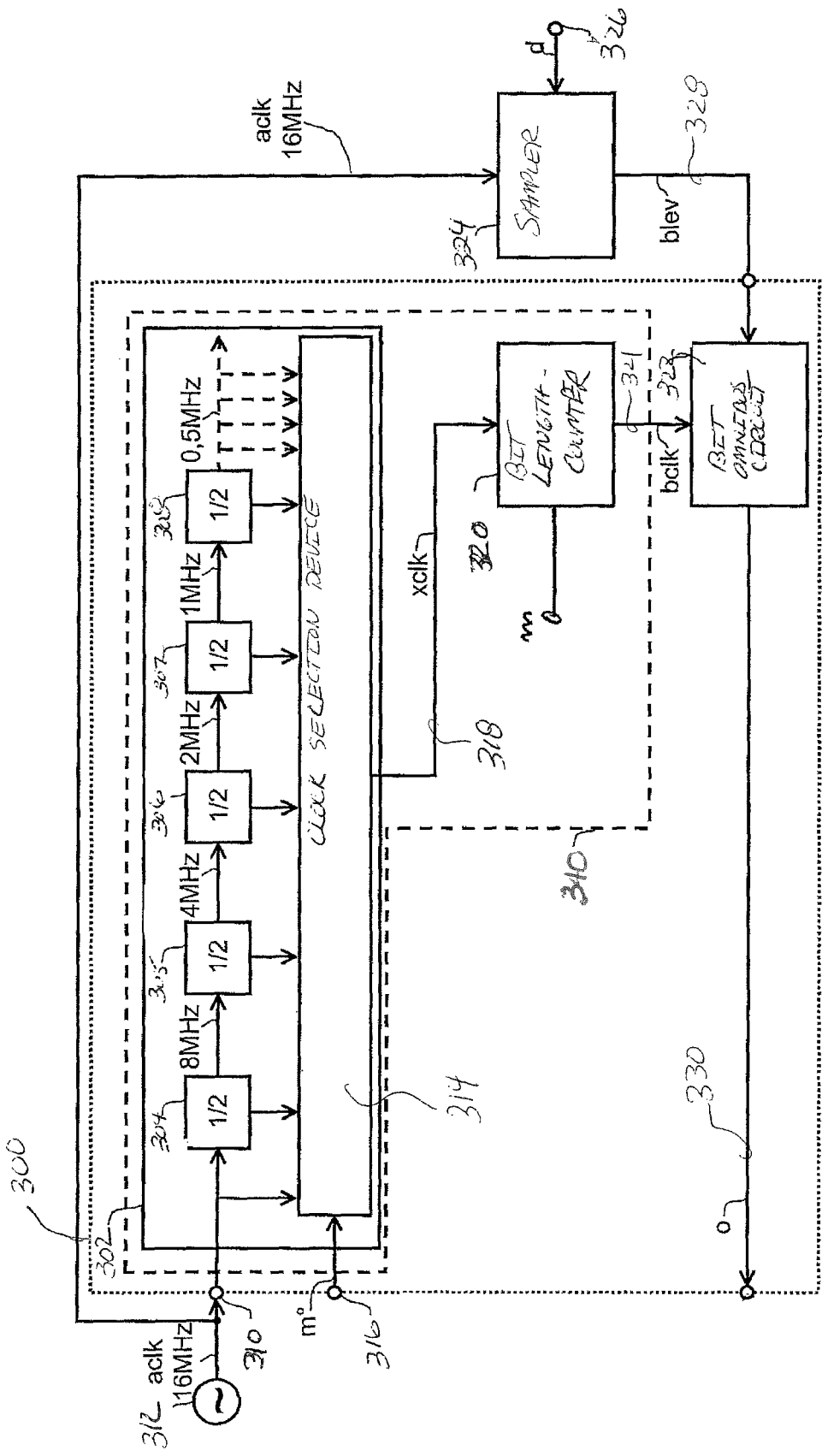
FIG. 3 illustrates yet another receiver circuit to receive asynchronous serial data.

FIG. 3 shows another embodiment that has structures of an integrated circuit 300 with an integrated adjustable prescaler 302. In terms of design, the prescaler 302 corresponds to the prescaler of FIG. 2 and comprises a divider chain with dividers 304-308 to which a sampling clock aclk on the line 310 from oscillator 312 or through another divider connected on the input side is applied. This sampling clock aclk on the line 310 and the individual stage clocks of the clock dividers 304-308 are applied to a clock selection device 314. In addition, a selection signal or adjustment parameter m° on line 316 is applied to the clock selection device 314. The prescaler 302 thus outputs a bit length counter clock xclk on line 318 as a function of the applied adjustment parameter m° on the line 316.

Bit length counter clock signal xclk on the line 318 is applied to bit length counter 320 which is designed as an adjustable bit length counter, or, as shown, as a fixed bit length counter. The bit length counter 320 in turn outputs bit clock bclk on a line 321 to a bit omnibus circuit 322.

The sampling clock signal aclk on the line 310 which is fed to the prescaler 302 is also applied to a sampler 324 independent therefrom. Asynchronous serial data d on line 326 are also applied to the sampler 324. The sampler 324 outputs a bit level blev on line 328 to the bit omnibus circuit 322 which supplies corresponding data o on a line 330. Due to the fact that the prescaler 302 is integrated into the bit length counter 320, the sampler 324 has a higher clock rate than is the case with conventional circuits.

In this circuit, the prescaler 302 and the bit length counter 320 are controlled such that the bit length counter provides an effective and adjustable division 1/m as a function of the applied sampling clock signal aclk on the line 310 and the adjustment parameter m° on the line 316. The prescaler 302 and the bit length counter 320 here form a structural unit 340 within the integrated circuit 300, while the sampler 324 and the bit omnibus circuit 322 are formed by additional structural components of the integrated circuit 300, or by stand-alone components. However, all the components can be designed as stand-alone modules or IGs.

Although the present invention has been illustrated and described with respect to several preferred embodiments thereof, various changes, omissions and additions to the form and detail thereof, may be made therein, without departing from the spirit and scope of the invention.

What is claimed is:

1. An integrated circuit for transferring asynchronous serial data, comprising:
   a sampler configured to sample the asynchronous serial data with a sampling clock;
   a bit length counter configured to determine a bit clock by counting a number of predetermined clock cycles of the sampling clock, where a bit length terminal variably adjusts the number of predetermined clock cycles of the bit length counter; and
   an adjustable prescaler configured to receive a system clock and generate the sampling clock,
   wherein the bit length counter comprises an adjustable bit length counter.

2. The integrated circuit of claim 1, wherein the adjustable prescaler has a divisor parameter of $½^n$ where n=1, 2, 3 ... etc.

3. The integrated circuit of claim 1, wherein the sampler is controlled by the system clock.

4. An integrated circuit for transferring asynchronous serial data, comprising:
   a sampler configured to sample the asynchronous serial data with a sampling clock;
   a bit length counter configured to determine a bit clock by counting a number of predetermined clock cycles of a bit length counter clock, where a bit length terminal variably adjusts the number of predetermined clock cycles of the bit length counter; and
   an adjustable prescaler configured to receive the sampling clock and generate the bit length counter clock,
   wherein the bit length counter comprises an adjustable bit length counter,
   wherein the sampling clock and an adjustment parameter are applied to the adjustable prescaler to determine the number of predetermined clock cycles, and
   wherein the adjustable prescaler makes a bit time determinable for the bit length counter by counting a number of clock cycles of the bit length counter clock that is variably adjustable relative to the sampling clock.

5. The integrated circuit of claim 4, wherein the adjustable prescaler comprises a clock selection device that provides the bit length counter clock.

6. A method for transferring asynchronous serial data of an integrated circuit, comprising the steps of:
   Sampling, by a sampler, the asynchrounous serial data with a sampling clock;
   Determining, by an adjustable bit length counter, a bit clock by counting a number of predetermined clock cycles of the sampling clock;
   variably adjusting, by a bit length terminal, the number of predetermined clock cycles of the bit length counter; and
   receiving a system clock, by an adjustable prescaler, to generate the sampling clock.

\* \* \* \* \*